(12) United States Patent
Klucher et al.

(10) Patent No.: US 8,196,213 B2
(45) Date of Patent: Jun. 5, 2012

(54) VERIFICATION OF UN-TRUSTED CODE FOR CONSUMPTION ON AN INSECURE DEVICE

(75) Inventors: Michael Klucher, Duvall, WA (US); Paul L. Bleisch, Sammamish, WA (US); Joerg Raymound Brown, Woodinville, WA (US); Robert S. Unoki, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 590 days.

(21) Appl. No.: 12/171,936

(22) Filed: Jul. 11, 2008

(65) Prior Publication Data
US 2010/0011446 A1 Jan. 14, 2010

(51) Int. Cl.
*G06F 17/30* (2006.01)
(52) U.S. Cl. .................... 726/27; 726/4; 726/26
(58) Field of Classification Search ............... 726/27; 718/1; 719/328–331
See application file for complete search history.

(56) References Cited

U.S. PATENT DOCUMENTS

| | | | |
|---|---|---|---|
| 6,128,774 A | 10/2000 | Necula et al. | |
| 6,314,445 B1 * | 11/2001 | Poole | 718/1 |
| 6,393,569 B1 * | 5/2002 | Orenshteyn | 726/4 |
| 6,595,856 B1 | 7/2003 | Ginsburg et al. | |
| 6,904,523 B2 * | 6/2005 | Bialick et al. | 713/156 |
| 6,944,772 B2 | 9/2005 | Dozortsev | |
| 7,028,185 B2 * | 4/2006 | Wheeler et al. | 713/170 |
| 7,080,249 B1 | 7/2006 | Jakubowski et al. | |
| 7,127,606 B2 * | 10/2006 | Wheeler et al. | 713/156 |
| 7,179,170 B2 | 2/2007 | Martinek et al. | |
| 7,743,423 B2 * | 6/2010 | Lange et al. | 726/26 |
| 7,784,102 B2 * | 8/2010 | Sperry | 726/27 |
| 2004/0060058 A1 * | 3/2004 | Liang et al. | 719/331 |
| 2005/0108562 A1 | 5/2005 | Khazan et al. | |
| 2005/0198170 A1 * | 9/2005 | LeMay et al. | 709/206 |
| 2006/0230451 A1 | 10/2006 | Kramer et al. | |
| 2007/0124812 A1 * | 5/2007 | Weeks et al. | 726/10 |
| 2007/0150937 A1 | 6/2007 | Gatto et al. | |
| 2008/0004121 A1 | 1/2008 | Gatto et al. | |
| 2008/0065893 A1 * | 3/2008 | Dutta et al. | 713/176 |
| 2008/0075079 A1 * | 3/2008 | Smith | 370/392 |
| 2008/0148298 A1 * | 6/2008 | Chatterjee et al. | 719/328 |

OTHER PUBLICATIONS

Lambright, D.H., "Automated Verification of Mobile Code," http://historical.nestri.org/litesite-data/arizona_cs/TR97-14.pdf, Nov. 3, 1997, 1-40.
Sekar et al., "Model-Carrying Code: A Practical Approach for Safe Execution of Untrusted Applications," http://www.cs.rochester.edu/meetings/sosp2003/papers/p214-sekar.pdf, 2003, 1-14.
Gee, K., "Installation Best Practices for Massively Multiplayer Online Games," http://msdn.microsoft.com/en-us/library/bb232920(VS.85).aspx, Feb. 2007, 1-5. Peterspn et al., "A Flexible Containment Mechanism for Executing Untrusted Code," http://sandbox.sourceforge.net/doc/html/sandbox_usenix _2002.html, downloaded 2008, 1-25.

* cited by examiner

*Primary Examiner* — Michael Simitoski
*Assistant Examiner* — Fahimeh Mohammadi
(74) *Attorney, Agent, or Firm* — Woodcock Washburn LLP

(57) ABSTRACT

Disclosed is a code verification service that detects malformed data in an automated process and rejects submission and distribution if any malicious code is found. Once the submission is verified it may be packaged in container. The container may then be deployed to a mobile device, and the public key may be used to verify that the container authentic. The device can load trusted managed libraries needed to execute the application and a manager can ensure that only trusted libraries access native resources of the device.

19 Claims, 13 Drawing Sheets

VERIFICATION OF UN-TRUSTED CODE FOR CONSUMPTION ON AN INSECURE DEVICE

BACKGROUND

As the computing power of mobile devices increase more sophisticated applications can be developed to utilize these resources. Typically a provider of such a mobile device may want to protect the device from attackers that try and obtain digital rights management keys or device keys. One way to secure the device is to 'close' the mobile device, e.g., manufacture the device in such a way as to only allow a certain type of hardware and proprietary closed source software. By closing the mobile device the provider can provide some level of security by making it more likely than not that only approved code and hardware is used in the device.

While closing the mobile device may make it more difficult for an attacker to compromise the device, a provider may want to allow third parties to have some ability to develop applications. A provider may allow for some third party code to execute on a closed mobile device by providing a sandbox that verifies third party code at runtime, or by configuring the operating system of the device to segregate third party code from kernel mode code. While these techniques exist, there is a need for alternative techniques that can augment or supplement the typical security measures that require less computational power from the mobile device and enable the provider to have more control over how third party code is treated by the device.

SUMMARY

An embodiment of the present disclosure provides a method that includes, but is not limited to granting, to a managed library, access to native resources of an operating system in response to validating a digital certificate associated with the managed library; and denying, to a managed application, access to native resources of the operating system, wherein the managed application includes a digital certificate authorizing the managed application to access a specific native resource of the operating system through the managed library. In addition to the foregoing other method aspects are described in the detailed description, drawings, and claims that form the present disclosure.

An embodiment of the present disclosure provides a method that includes, but is not limited to receiving, by a manager, a request from a managed application to access a native system resource through a managed library; authorizing, by the manager, the request to access the native system resource through the managed library, wherein the manager includes information that identifies managed libraries that the managed application is authorized to access, further wherein the manager is effectuated by native instructions; authorizing, by the manager, the request to access the native system resource by the managed library, wherein information that identifies that the managed library is authorized to access the native system resource was obtained from a digital certificate associated with the managed library; sending, by the managed library, a request to access the native system resource to a runtime host, wherein the runtime host is effectuated by native instructions; and accessing, by the runtime host, the native system resource. In addition to the foregoing other method aspects are described in the detailed description, drawings, and claims that form the present disclosure.

An embodiment of the present disclosure provides a method that includes, but is not limited to receiving a package from a networked computer system; identifying an executable in the package; verifying managed metadata associated with the executable, wherein the managed metadata describes the structure of executable, further wherein verifying the managed metadata includes inspecting the managed metadata at runtime to determine that the executable includes type safe code; sending, by the managed library, a request to access the native system resource to a runtime host, wherein the runtime host is effectuated by native instructions; and accessing, by the runtime host, the native system resource. In addition to the foregoing other method aspects are described in the detailed description, drawings, and claims that form the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
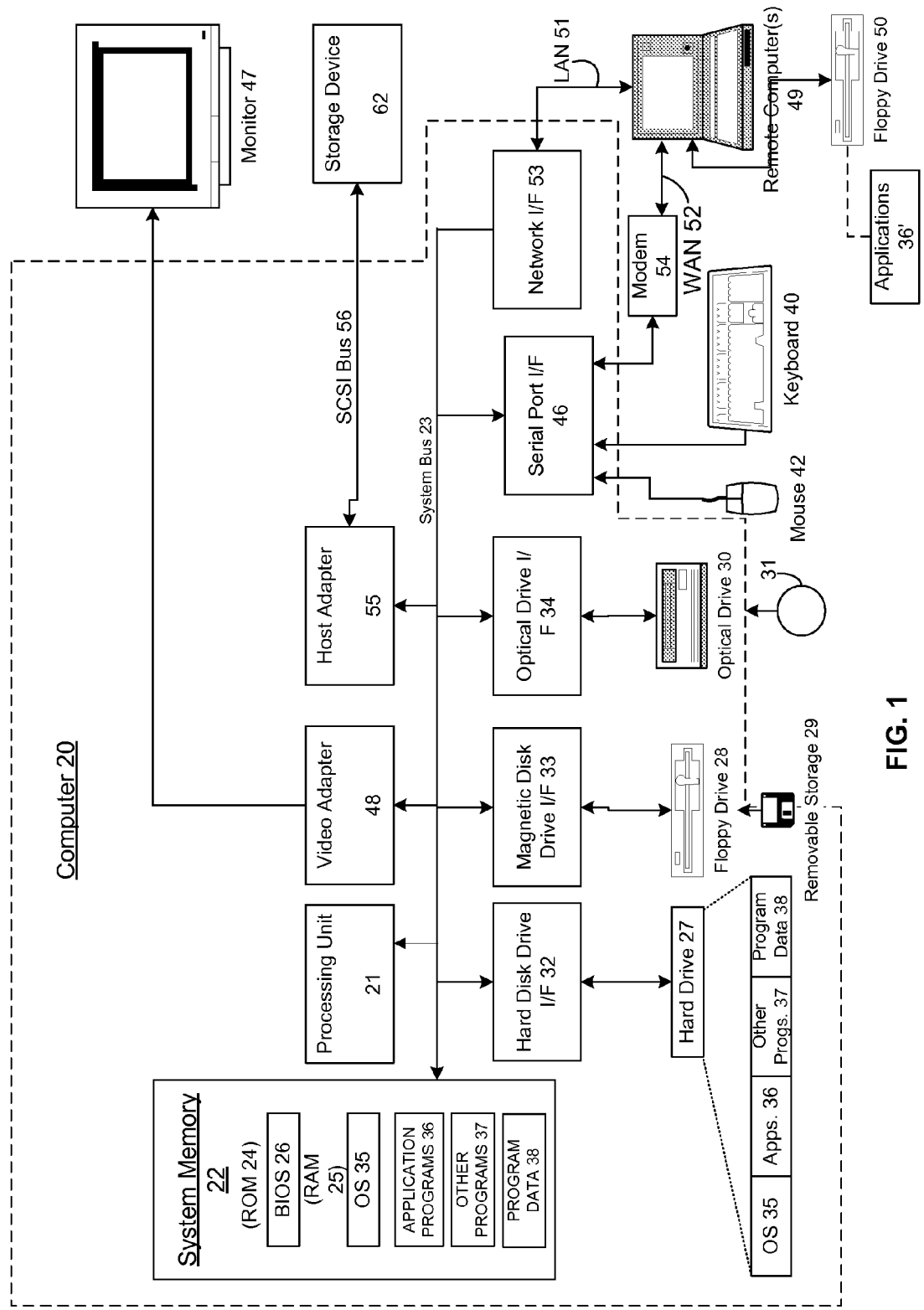
FIG. 1 depicts exemplary general purpose computing system.

Numerous embodiments of the present disclosure may execute on a computer. FIG. 1 and the following discussion is intended to provide a brief general description of a suitable computing environment in which the disclosure may be implemented. One skilled in the art can appreciate that the computer system of FIG. 1 can in some embodiments effectuate the validation system 212, the community feedback server 206, the electronic market place 222, developer 204, and peer reviewers 208 and 210. One skilled in the art can also appreciate that the elements depicted by FIG. 2-5 can include circuitry configured to instantiate specific aspects of the present disclosure. For example, the term circuitry used through the disclosure can include specialized hardware components configured to perform function(s) implemented by firmware or switches. In other example embodiments the term circuitry can include a general purpose processing unit configured by software instructions that embody logic operable to perform function(s). In example embodiments where circuitry includes a combination of hardware and software, an implementer may write source code embodying logic that can be compiled into machine readable code and executed by a processor. Since one skilled in the art can appreciate that the state of the art has evolved to a point where there is little difference between hardware, software, or a combination of hardware/software and the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice.

Referring now to FIG. 1, an exemplary general purpose computing system is depicted. The general purpose computing system can include a conventional computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
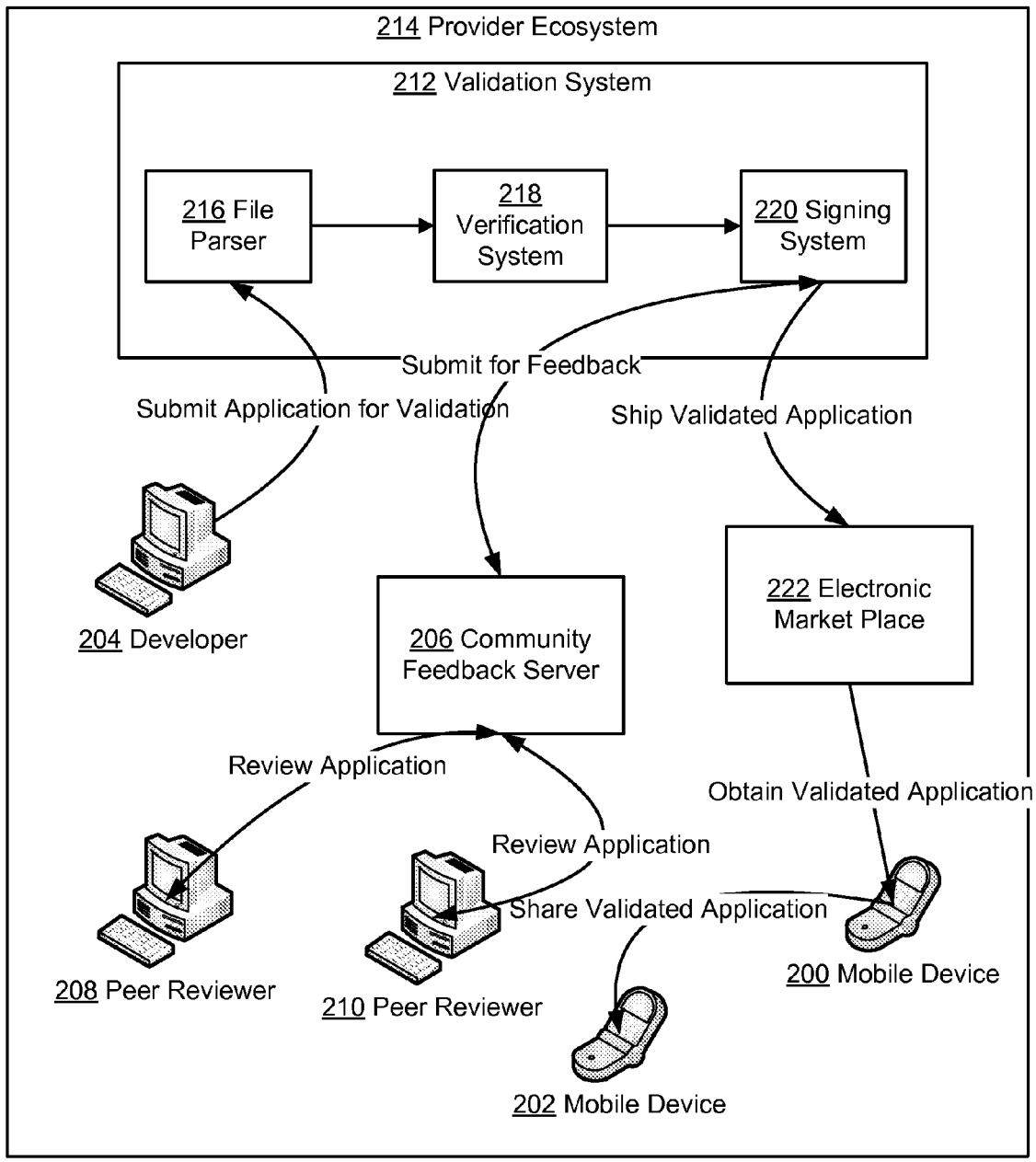
FIG. 2 illustrates an example environment wherein aspects of the present disclosure can be implemented.

Referring now to FIG. 2, it generally illustrates an example environment wherein aspects of the present disclosure can be implemented. One skilled in the art can appreciate that the example elements depicted by FIG. 2 provide an operational framework for describing the present disclosure. Accordingly, in some embodiments the physical layout of the environment may be different depending on different implementation schemes. Thus the example operational framework is to be treated as illustrative only and in no way limit the scope of the claims.

FIG. 2 illustrates an example electronic ecosystem 214 that can be managed by an ecosystem provider, e.g., a company. The electronic ecosystem 214 can be implemented so that application developers such as developer 204 can create applications for mobile devices such as mobile device 200 and remote mobile device 202. Generally, a developer 204 can in an example embodiment have access to a computer system that can include components similar to those described in FIG. 1. The developer 204 can in this example embodiment obtain a software development kit from the ecosystem provider by registering with the provider and/or pay a fee. Once the developer 204 obtains the software development kit it can be installed and used to enhance the design, development, and management of applications, e.g., videogames, word processing programs, etc. The software development kit in an example embodiment can include a large library of useful functions that are provided in order to increase code reuse across projects. For example, in an embodiment the software development kit can be thought of as the skeleton that provides libraries that enable low level functions. This type of software development kit allows developers to concentrate on developing their application instead of working out the low level details of coding for a specific machine environment. In an embodiment the applications and libraries can be developed in an intermediate language that is separate from any native instruction set of a processor. The software development kit can be used to generate applications in this intermediate language that execute in a software environment that manages the application's runtime requirements. The software environment can include a runtime, e.g., a virtual machine, that manages the execution of programs by just in time converting the instructions into native instructions that could be processed by the processor.

Once the application is developed a compiled version of it can be submitted to a validation system 212 that can be maintained by the ecosystem provider. For example, in an embodiment the application can be transmitted to the ecosystem provider as a package of assemblies, e.g., executables, libraries obtained from the software development kit, and any libraries developed for the application by the developer 204. Generally, the validation system 212 can in an embodiment include circuitry for a file parser 216, a verification system 218, and a signing system 220 each of which can include components similar to those described in FIG. 1. For example, file parser 216 can in one embodiment include circuitry, e.g., a processor configured by a program, for identifying assemblies that include executables. In this example embodiment the instructions of the application submitted by the developer 204 can be verified and stored in a container that includes a digital signature.

Once the application is verified it can be submitted to a community feedback server 206. The community feedback server 206 can generally be configured to store newly developed applications and transmit the new applications to peer reviewers 208 and 210 in response to requests. In at least one example embodiment the peer reviewers 208 can add to the application by downloading the source code of the application and use a copy of the software development kit to add to the application. In this example if the application includes more than source code then the validation system 212 may be invoked before it can be redistributed to peer reviewers.

After the application is verified it can be stored in an electronic market place 222 that can also include components similar to those described in FIG. 1. The electronic market place 222 can additionally include circuitry configured to sell copies of the application to members of the public. The electronic market place 222 can be configured to transmit the application in the container to either the mobile device 200 over a wireless/wired network connection or to a computer (not shown) where it can then be transmitted to the mobile device over a local connection.

Figure 3:
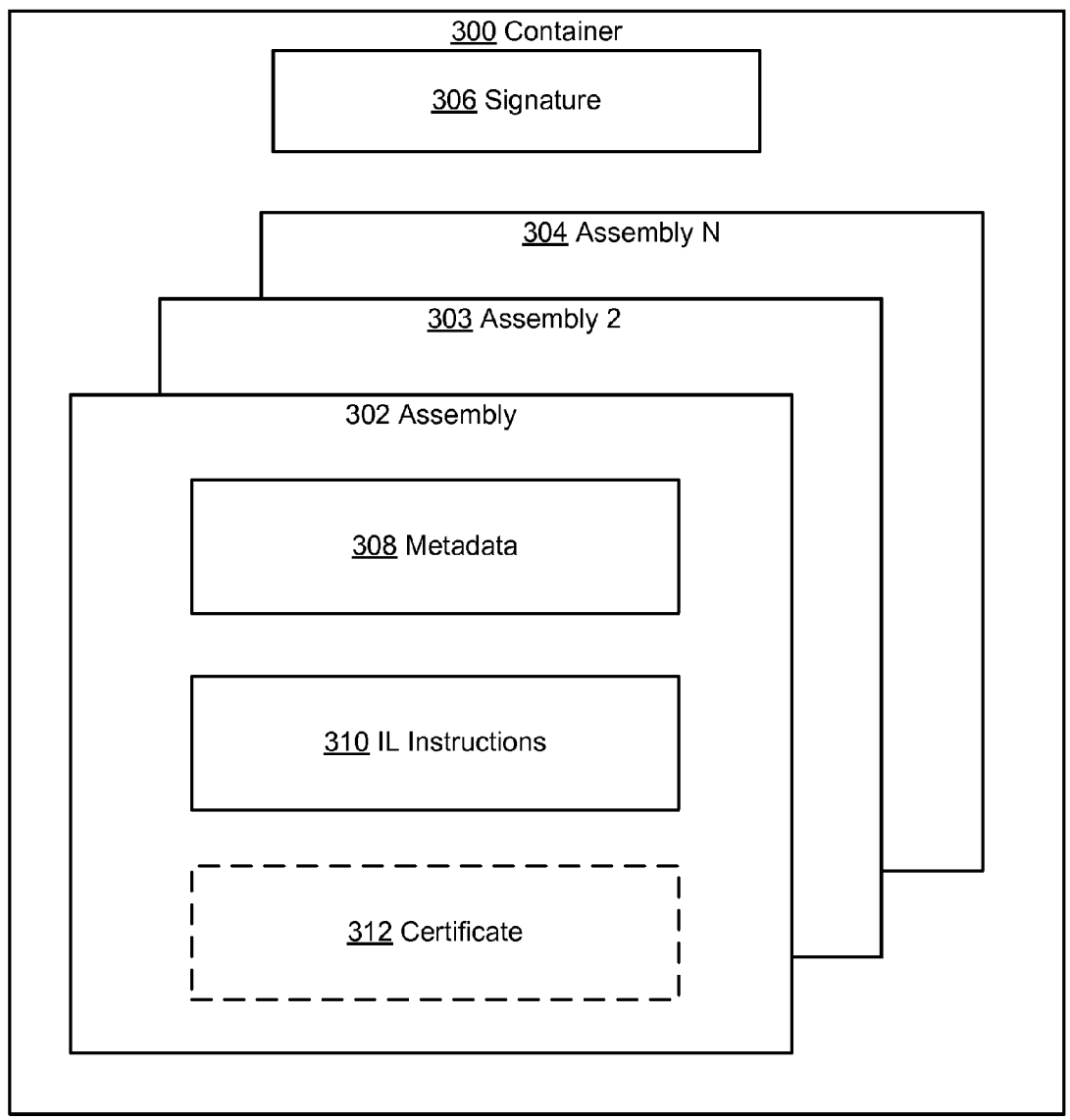
FIG. 3 illustrates an example container.

Referring now to FIG. 3, it illustrates an example container 300 that can be transmitted to the mobile device 200 from an electronic market place 222. For example, in an embodiment of the present disclosure each application can be stored in its own container 300. The container 300 in an embodiment can be an electronic wrapper and the information inside the wrapper can be signed with a private key by the signing system 220 of FIG. 2. In this example, the signing system 220 can embed a digital signature 306 in the container 300 so that the mobile device 200 can determine that the container 300 is authentic.

Continuing with the description of FIG. 3, the container 300 in this example may contain one or more assemblies such as assemblies 302-304. For example, in an embodiment of the present disclosure the software development kit can be used to generate software packages for a given platform. The assemblies 302-304 in this example can effectuate the application and contain information that can be used by a runtime to find, locate, and execute the application on the platform. As is illustrated by FIG. 3, in one embodiment each assembly can include intermediate language instructions 310, e.g., machine independent partially compiled code, and metadata 308 that describes the intermediate language instructions. The metadata in an embodiment can describe every type and member defined in the intermediate language instructions in a language-neutral manner so as to provide information about how the assembly works.

Continuing with the description of FIG. 3, in an embodiment of the present disclosure an assembly may include a certificate 312. For example, the certificate 312 is indicated in dashed lines which are indicative of the fact that only certain assemblies may include certificates in embodiments of the present disclosure. For example, the ecosystem provider may only embed certificates in assemblies that were developed by the ecosystem provider. In other example embodiments the ecosystem provider may embed certificates in assemblies that were coded by a trusted third party, e.g., a company that the ecosystem provider has a business relationship with. The certificate 312 in embodiments of the present disclosure can be used by the mobile device 200 to determine whether the instructions that effectuate an assembly have been scrutinized by the ecosystem provider to ensure that the assembly can not be used in a malicious way and, for example, determine which managed libraries can be called by the application. A certificate in embodiments of the present disclosure can be similar to a digital signature; however in certain instances the certificate can convey different information than the digital signature, e.g., a certificate may indicate a resource permission level for the assembly whereas the signature may be used as a source identifier.

Figure 4:
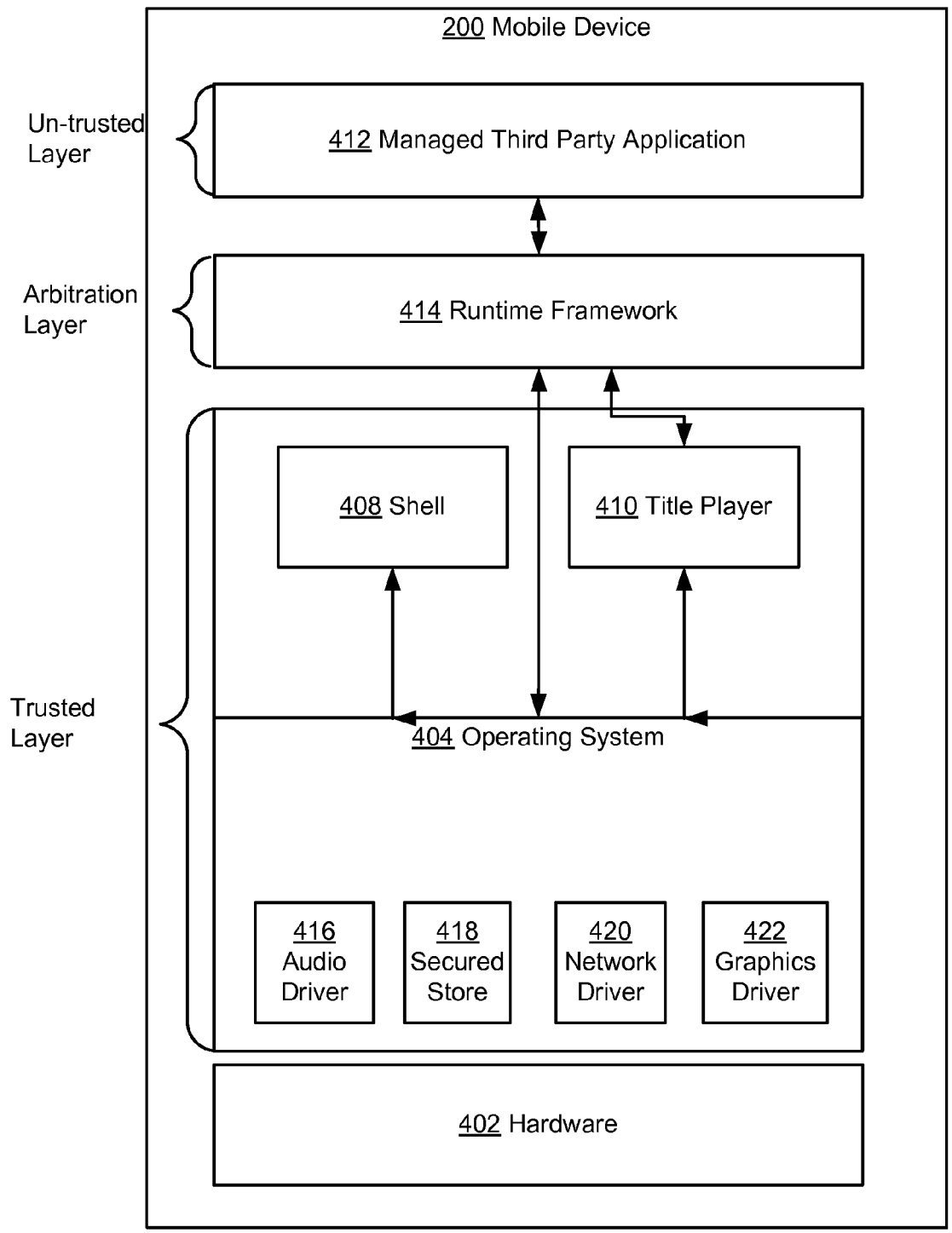
FIG. 4 it illustrates an example mobile device that can be used in embodiments of the present disclosure.

Referring now to FIG. 4, it illustrates an example mobile device 200 that can be used in embodiments of the present disclosure. For example, mobile device 200 can include a mobile phone, a personal data assistant, or a portable media player, e.g., a mobile device configured to store and play digital content such as video, audio, and/or execute applications. As was mentioned above, a major concern with opening up a mobile device 200 to third party applications is that an attacker could attempt to compromise the mobile device 200 in order to obtain DRM keys, device keys, user data and the like. Generally, in some closed mobile devices the software stored on mobile device 200 can be considered native, e.g., the instructions can be written to run on the physical processor of hardware 402 and if an individual could access the native code they could potentially access any information the device stores. In closed mobile devices the native code is protected by scrutinizing the code prior to commercializing the product, e.g., by inspecting the code to determine that it does not include anything that could be exploited to compromise and/or damage the mobile device 200, and coding the native software in such a way to prevent the mobile device 200 from executing any third party code. The ecosystem provider can ensure that the mobile device 200 does not execute third party code by checking the authenticity of each piece of software prior to allowing it to execute. If any portion of the system software can't be authenticated, the mobile device 200 can be configured to refuse to startup. For example, when the mobile device 200 is powered on a boot loader stored in hardware 402 can be authenticated, e.g., a digital signature of the boot loader can be checked. The boot loader can in turn authenticate and load the operating system 404. The operating system 404 in this example embodiment can include an audio driver 416, a secured store 418, e.g., a secured area of memory that includes device secrets, a network driver 420, and a graphics driver 422. The operating system 404 in turn can authenticate native application program interfaces used to invoke operating system methods, the shell 408, e.g., the user interface of the operating system, and a title player 410, e.g., a native executable that launches applications and hosts them within its process.

As depicted by FIG. 4, in an embodiment the preceding portion of the components of the mobile device 200 can be considered the trusted layer of software, e.g., native software developed by the ecosystem provider, that can be stored in firmware of the mobile device 200. In embodiments of the present disclosure however the ecosystem provider may want to allow third party applications to execute on mobile device 200. Since these third party applications were not developed by the ecosystem provider, and thus may not be been stored in the firmware of the mobile device 200, a mechanism needs to be put in place to ensure that the managed application 412 are not given the same level of trust as the trusted software. Third party code may need to remain un-trusted because in at least one embodiment of the present disclosure the core functionality of the mobile device, e.g., graphics processing, networking, memory management, and/or audio, are implemented by operating system methods to improve system performance and the operating system itself may lack a way to gate access to the core functionality. Thus the ecosystem provider has to expose an interface to the operating system 404 and protect the interface from being accessed by malicious code. In order to prevent the managed application 412 from invoking native methods, or having unrestricted access to memory, an arbitration layer including a runtime framework 414 can be instantiated that gates access to the operating system 404. In example embodiments of the present disclosure when a managed application 412 attempts to access an operating system resource the runtime framework 414 can be configured to determine whether the managed application 412 has permission to access such a resource and either allow or deny its request.

Figure 5:
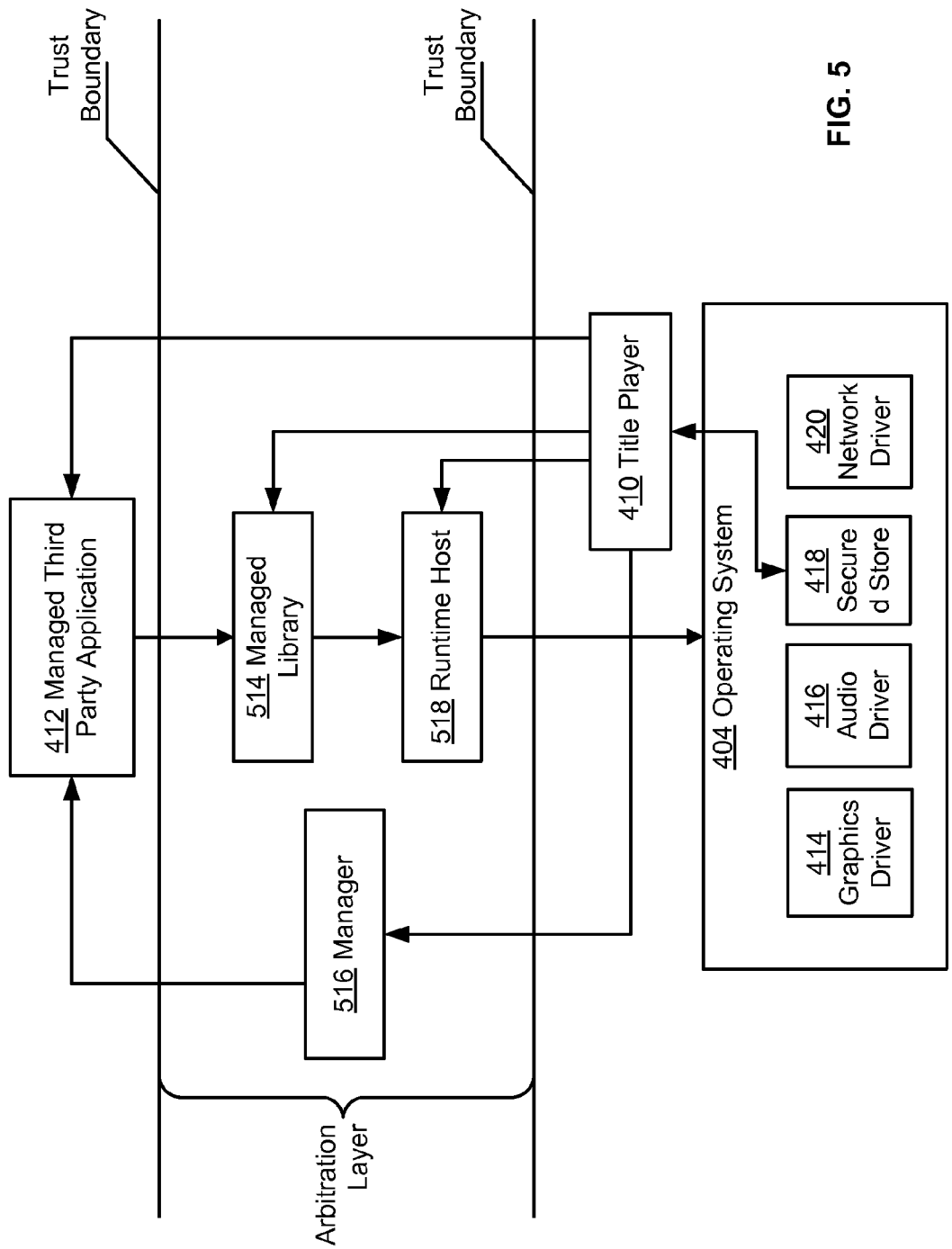
FIG. 5 depicts an example arbitration layer that can be used to implement aspects of the present disclosure.

Referring now to FIG. 5 it depicts an example arbitration layer that can be used to implement aspects of the present disclosure. For example, FIG. 5 depicts a managed application 412 that can be, for example, a videogame, a word processing application, a personal information manager application or the like that can access native resources of the operating system 404 via at least one managed library. In order to invoke the functionality of the operating system 404 at least one managed library can be selectively exposed to the managed application 412 via a manager 516 that can be configured to restrict the third party application's access to resources other than those provided by one or more select libraries. In embodiments of the present disclosure, a managed library 514 can be dynamically loaded at runtime depending on what dependencies are required for the managed application 412. In an embodiment the managed library 514 can be operable to access any native resource at runtime therefore the manager 516 needs to be configured in this example to deny a managed application's request to access native resources and restrict access to only but a few select managed libraries. As illustrated by FIG. 5, the arbitration layer in this example embodiment can additionally include a runtime host 518 that can in certain embodiments be configured to call methods of the operating system 404 that actually implement the requests of the application.

Continuing with the description of FIG. 5, in an embodiment title player 410 can be configured to load and authenticate runtime host 518, manager 516, managed library 514, and managed application 412. For example, in an embodiment runtime host 518, manager 516, and managed library 514 can each include digital signatures that can be authenticated by the title player 410 prior to execution to ensure that they had not been tampered with. The title player 410 can check a digital certificate for each managed assembly to determine what privileges they have prior to loading them. When the title player 410 loads a managed assembly, e.g., a part of the managed application 412 or a managed library 514, it can be configured to check the assembly's certificate to determine what privileges to grant to it. In an embodiment each managed application 412 can include a certificate that is associated with a set of privileges, e.g., the certificate can itemize the rights or the certificate can reference a set of rights that can be stored in a table of the secured store 418. The title player 410 can check the authenticity of the assembly and if it is legitimate the title player 410 can check the certificate to determine what privileges should be granted. The title player 410 can obtain a set of privileges and make them available to the manager 516 so that the manager 516 can enforce the privileges by selectively granting or denying a managed application's access requests to certain managed libraries 514. In the same, or other embodiments, if a managed third party application lacks a certificate 312 the title player 410 can be configured to determine that it has no privileges and direct the manager 516 to prevent the assembly from invoking any native resources such as operating system methods or native libraries, as well as denying the use of any managed library 514 for which possession of such a certificate is required.

The following figures depict a series of flowcharts of processes. The flowcharts are organized such that the initial flowcharts present processes implementations via an overall "big picture" viewpoint. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various operational procedures.

Figure 6:
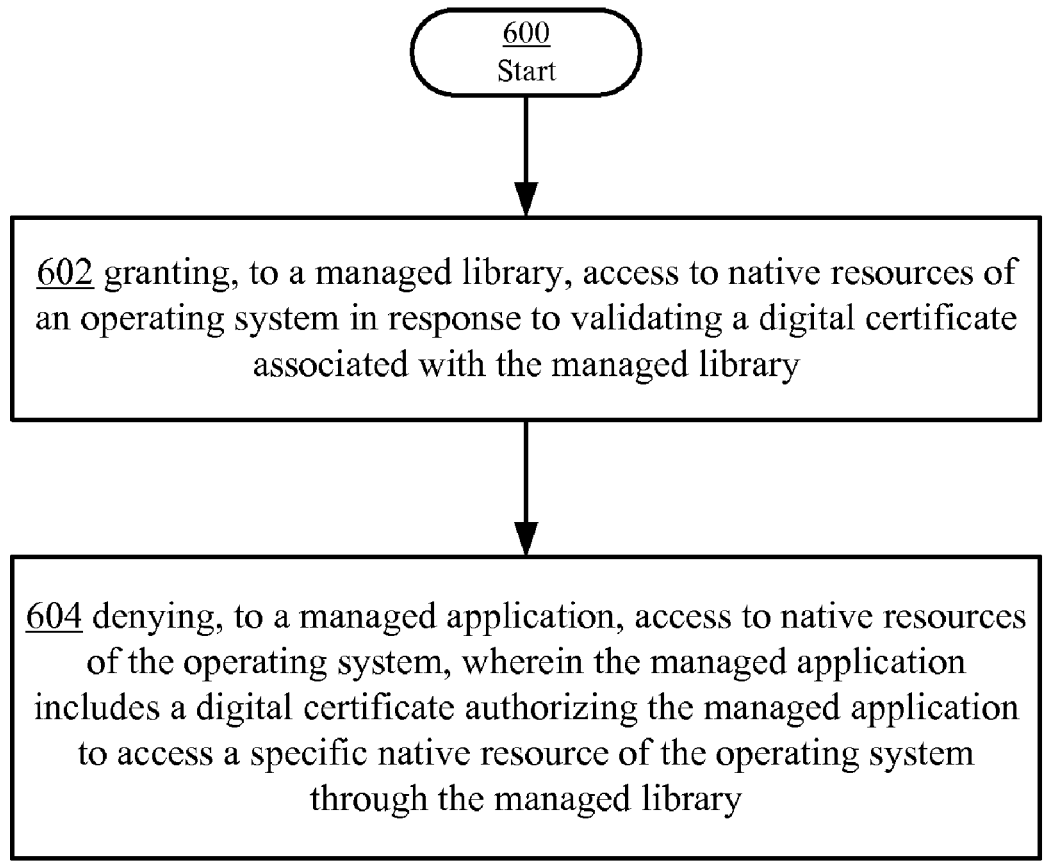
FIG. 6 depicts an example operational procedure related to securing a computing device.

Referring now to FIG. 6, it illustrates example operations related to securing a computing device including operations 600, 602, and 604. As is illustrated by FIG. 6, operation 600 begins the operational procedure and operation 602 illustrates granting, to a managed library, access to native resources of an operating system in response to validating a digital certificate associated with the managed library. For example, and referring to FIG. 5, in an embodiment of the present disclosure a managed library 514 can be granted access to native resources of an operating system. In this example the managed library 514 can be considered managed because the instructions that effectuate it can be executed within virtual machine such as the common language runtime or java virtual machine. The manager 516 can be configured to grant the managed library 514 access rights to a native operating system resource by allowing it to be loaded into main memory after verifying the authenticity of a digital certificate 312. The digital certificate 312 can evidence that the managed library 514 includes scrutinized code that was developed by, for example, the ecosystem provider. In one embodiment the manager 516 can be configured to check the digital certificate 312 in order to protect the operating system 404. The operating system in this example may not have the ability to protect itself from malicious attacks, e.g., the operating system 404 may not implement kernel mode and user mode permission levels. In this example embodiment the resources of the operating system 404 can be protected by a layer of security enforced by the manager 516. In the same or other embodiments native instructions may have privileges to access any resource of the mobile device 200 and the operating system 404 may not have a native ability to enforce security policies. In this example embodiment if the native instructions were accessed by a malicious third party application then an attacker could potentially access any system resource such as a device key, a display driver, and/or damage the mobile device 200. In another example embodiment the operating system 404 may include a native ability to protect itself. In this example the operating system 404 can be protected by an additional layer of security enforced by the manager 516.

Continuing with the description of FIG. 6, operation 604 illustrates denying, to a managed application, access to native resources of the operating system, wherein the managed application includes a digital certificate authorizing the managed application to access a specific native resource of the operating system through the managed library. For example, and in addition to the previous example the ecosystem provider may want to allow third party applications such as videogames to be developed and allowed to execute on the mobile device 200. In certain embodiments however the ecosystem provider may not want third party managed applications to access any native resources such as native dynamically linked libraries, kernel functions, and/or drivers. Thus, in this example embodiment the manager 516 can be configured to prevent the managed application 412 from accessing such native resources and/or terminate the managed application 412 if the managed application 412 attempts to access such a resource. Managed application 412 can in an embodiment be stored in a digitally signed container such as container 300 of FIG. 3. When the managed application 412 is launched, the container 300 can be checked to determine that it has not been tampered with, e.g., the digital signature 306 can be checked. If the digital signature 306 is valid, then the assemblies that effectuate the managed application 412 can be loaded into runtime space. Each assembly in the container 300 can be checked for a certificate 312 that indicates which managed libraries the application can call. The list of callable managed libraries can be stored in a table made accessible to the manager 516 and the manager 516 can be configured to prevent the managed application 412 from accessing native resources and/or managed libraries outside of the ones listed in the certificate 312. In this example the managed application 412 can be terminated if the managed application 412 attempts to access such a resource.

Figure 7:
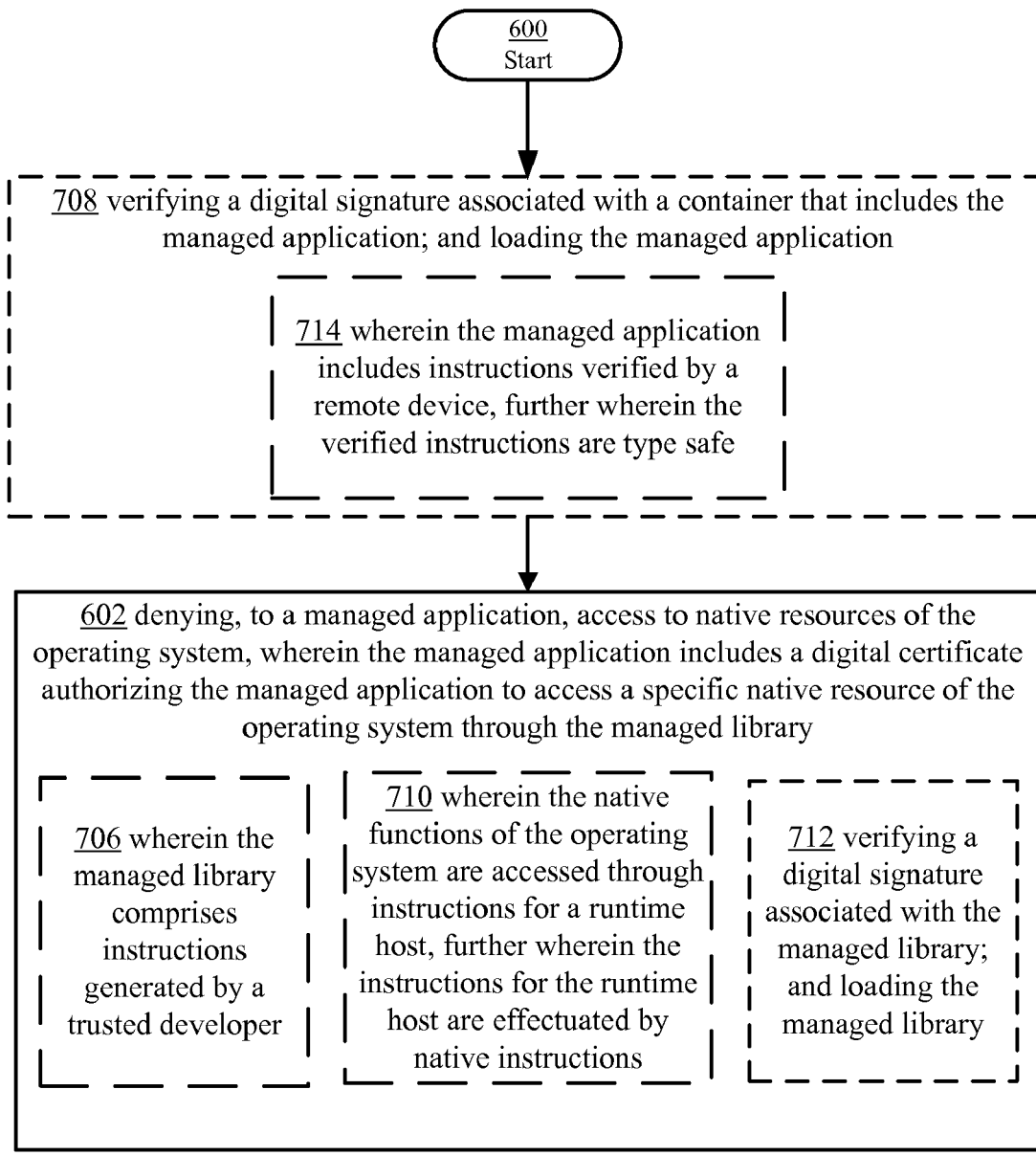
FIG. 7 depicts an alternative embodiment of the operational procedure of FIG. 6.

Referring now to FIG. 7, it depicts an alternative embodiment of the operational procedure of FIG. 6 including operations 706, 708, 710, 712, and 714. Operation 706 illustrates the operational procedure of FIG. 6, wherein the managed library comprises instructions generated by a trusted developer. For example, in one embodiment the managed library can be effectuated by intermediate language instructions and metadata. In this example the managed library 514 can have been generated by a trusted provider such as the ecosystem provider and/or a third party corporation that the ecosystem provider has a business relationship with. In this example the ecosystem provider can ensure that the managed library does not include malicious code or code that could be used in a malicious way by fully testing the code prior to releasing it to the public. In this example the ecosystem provider can ensure that the managed library can only be used to perform its indented function(s).

Continuing with the description of FIG. 7, it additionally illustrates operation 708 that depicts verifying a digital signature associated with a container that includes the managed application; and loading the managed application. For example, in an embodiment of the present disclosure the title player 410 can be configured to load the managed application 412 in response to user input and determine that the managed application 412 is un-trusted. In an embodiment the ecosystem provider may associate a certificate 312 with the managed application 412 that identifies it as un-trusted and list one or more managed libraries that the un-trusted application can call. In this example embodiment the ecosystem provider may determine that code developed by a third party can access managed libraries that the ecosystem provider developed and the manager 516 can be configured to prevent the managed application 412 from accessing native system resources and/or terminate the managed application 412 if it attempts to access native resources or managed libraries for which the managed application has not been authorized to access.

Continuing with the description of FIG. 7, it additionally illustrates operation 710 that shows the operational procedure of FIG. 6, wherein the native functions of the operating system are accessed through instructions for a runtime host, further wherein the instructions for the runtime host are effectuated by native instructions. For example, in an embodiment of the present disclosure the title player 410 can include instructions configured to validate a digital signature of a runtime host 518 and launch the runtime host 518. For example the instructions for the runtime host 518 can include an encrypted hash of the instructions that effectuate it. A corresponding public key can be stored in the secured store 418 of the mobile device 200 and made available when title player 410 attempts to load the runtime host 518. The runtime host 518 in an example embodiment can be authenticated prior to execution because the instructions that effectuate the runtime host 518 can be stored in mass storage such as a hard drive or flash memory in at least one embodiment. In this example an attacker could attempt to replace the mass storage device with a malicious copy that could include code to attempt to access the secured store. In this embodiment the risk from such an attack can be mitigated by validating the runtime host 518 prior to execution.

In an example embodiment when the mobile device 200 is powered on the runtime host 518 may be loaded into main memory after a user uses the shell 408 to execute the videogame. For example, in an embodiment of the present disclosure the mobile device 200 may launch native instructions from the trusted layer of software when the mobile device 200 is powered on and only load the arbitration layer of FIG. 4 and FIG. 5 if a user of the mobile device 200 wants to execute a third party application. In this example when the title player 410 is launched it can in turn launch the runtime host 518 after it authenticates the runtime host's digital signature.

Continuing with the description of FIG. 7, it additionally illustrates operation 712 that shows verifying a digital signature associated with the managed library; and loading the managed library. For example, in an embodiment of the present disclosure the title player 410 can include instructions configured to validate a digital signature of a container 300 that stores the managed library 514 and load the managed library 514. For example, in an embodiment of the present disclosure the container 300 can include a digital signature encrypted with a private key. A corresponding public key can be stored in the secured store 418 of the mobile device 200 and made available when title player 410 attempts to load the managed application 412.

Continuing with the description of FIG. 7, it additionally illustrates operation 714 that shows wherein the managed application includes instructions verified by a remote device, further wherein the verified instructions are type safe. For example, in an embodiment of the present disclosure the managed application 412 can be verified by the ecosystem provider prior to distribution to the mobile device 200. For example, in an embodiment verification can include examining the instructions and metadata associated with the managed application 412 to determine whether the code is type safe, e.g., that it accesses members of an object in well defined and allowed ways, it only accesses memory locations it is authorized to access, and/or that it does not access any private members of an object. During the verification process, the managed application's instructions can be examined in an attempt to confirm that the instructions can only access approved memory locations and only call methods through properly defined types.

Figure 8:
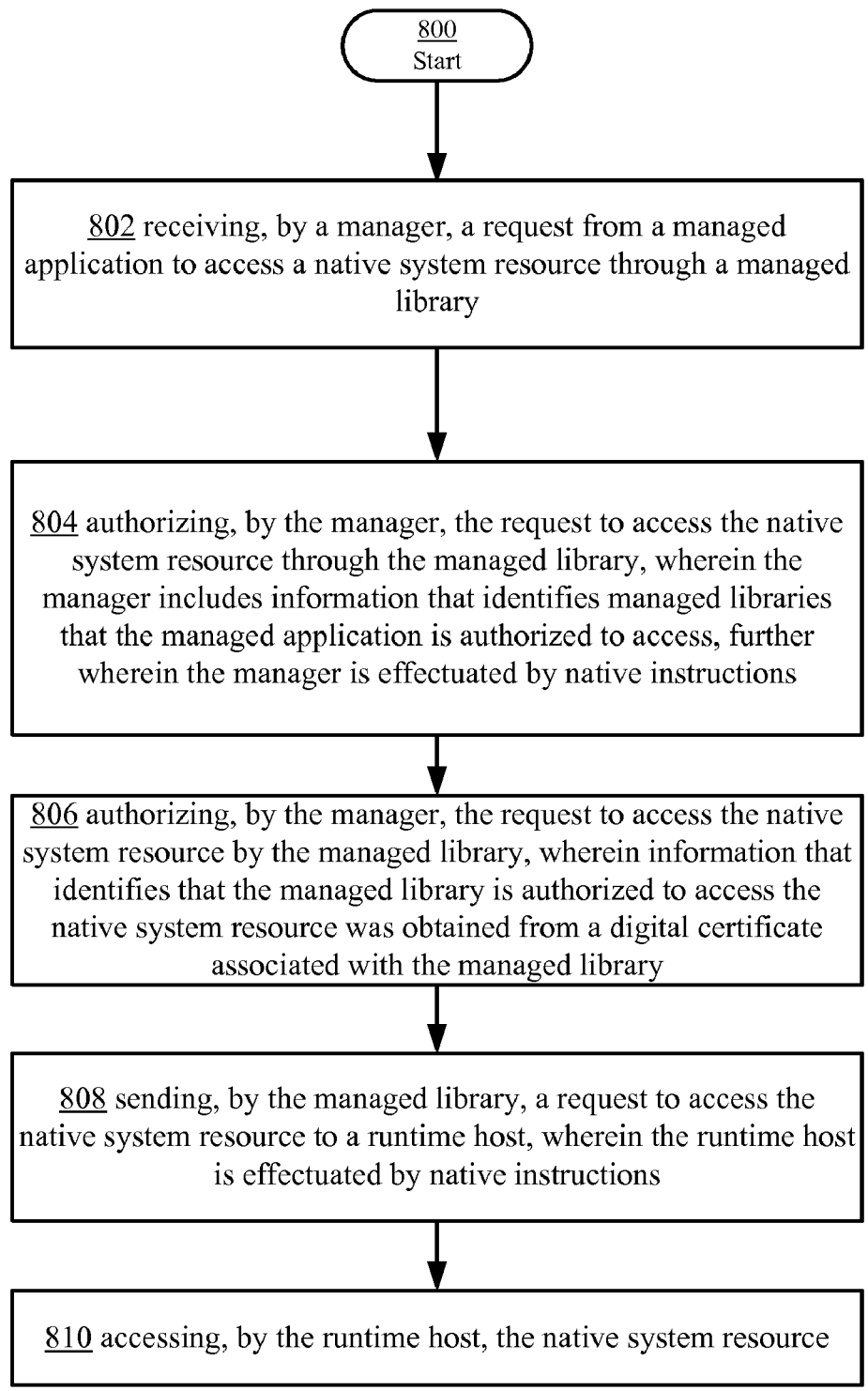
FIG. 8 depicts an example operational procedure related to protecting a closed computing device from executing un-trusted instructions.

Referring now to FIG. 8, it depicts an operational flowchart for practicing aspects of the present disclosure including operations 800, 802, 804, 806, and 808. Operation 800 beings the operational procedure and operation 802 illustrates receiving, by a manager, a request from a managed application to access a native system resource through a managed library. For example, a manager 516 can receive a request from a managed application 412 to access an operating system resource such as an application program interface for the operating system 404 via managed library 514. In an embodiment of the present disclosure a managed application 412 such as a contact book application may attempt to access a resource of the operating system 404 such as a list of phone numbers stored in the secured store 418 via the functionality of a contact book managed library. In this example graphics, audio, and network support may be integrated with the operating system 404 and an application that has access to the operating system 404 could for example, potentially have the ability to access memory reserved to store device secrets such as DRM keys. In this example the managed application 412 may send a request to a manager 516 to access the operating system 404 via the managed library 514. In this example both the managed application 412 and the managed library 514 can be considered managed because the instructions that effectuate them can be executed within virtual machine such as the common language runtime or java virtual machine. In this example the managed application 412 can be considered pure managed code because the managed application 412 is not allowed to access native resources and the managed library 514 can be considered non-pure managed code which indicates that the library is allowed to access some of the native resources.

Continuing with the description of FIG. 8, operation 804 illustrates authorizing, by the manager, the request to access the native system resource through the managed library, wherein the manager includes information that identifies managed libraries that the managed application is authorized to access, further wherein the manager is effectuated by native instructions. For example, and referring to FIG. 5, the manager 516 can be configured to allow the managed application 412 to access the managed library 514 in order to, for example, access a method of the graphics driver 422 for drawing a sprite at a certain location on a display. The manager 516 in this example embodiment can include a software process effectuated by native code. In this example the manager 516 can be configured to receive the request from the managed application 412 and determine whether the managed application 412 has permission to call the managed library 514 by accessing a table of information stored in memory such as RAM.

For example, in an embodiment of the present disclosure the manager 516 can store a table of information that includes a list of managed libraries that the managed application 412 can access. In the case of a pure managed assembly the list can include information that explicitly denies any attempt at calling native code or accessing reserved memory locations. If, for example, the pure managed assembly attempts to call a native dynamically linked library, access a memory location that stores a DRM key, or access a managed library that it is not permitted to access, the manager 516 can determine that a security violation occurred and terminate the managed application 412. In an example embodiment the list of managed libraries that the managed application 412 can access can be stored in the secured store 418. In this example the assembly 302-304 of FIG. 3 that contains the managed application 412 can be checked for a digital certificate 312. In the instance where the assembly does not include a certificate 312 the manager 516 can be configured to determine that the assembly is un-trusted and load a predefined list of managed libraries that the managed application 412 can access into the table.

In another embodiment instead of having a two tier trust system, e.g., a system where managed applications are granted full permission or no permission based on the presence or absence of a certificate 312, a multi-tiered system could be implemented by, for example, embedding different types of certificates in the assemblies or by including different sets of privileges in the certificates. In the first example the secured store 418 can be configured to include a table associating different types of certificates with different privileges, e.g., one certificate could be associated with a table entry that indicates that the managed application 412 is allowed to access a method of a network driver 420 and another certificate could be associated with a table entry that indicates that the managed application 412 is allowed to access an address book of a user stored in the secured store 418. The operating system 404 or the title player 410 in this example could decrypt the certificate 312 and associate a number in the certificate to a set of privileges stored in the secured store 418. In another embodiment the certificate itself could include information that identifies a set of operating system resources that the managed application 412 is allowed to access. In this example the operating system 404 or the title player 410 can be configured decrypt the certificate and compare a hash of the information in the certificate to an expected value. If the certificate is valid, the set of privileges can be retrieved from the certificate. Regardless as to how the operating system 404 or the title player 410 determines a managed application's privileges, the privileges can be transmitted to the manager 516 and the manager 516 can be configured to monitor instructions issued by the managed application 412 to determine whether it is attempting to access native code and/or load managed libraries that are not within the scope of its certificate.

Continuing with the description of FIG. 8, it additionally illustrates operation 806 that shows authorizing, by the manager, the request to access the native system resource by the managed library, wherein information that identifies that the managed library is authorized to access the native system resource was obtained from a digital certificate associated with the managed library. For example, in an embodiment of the present disclosure the manager 516 can be configured to authorize the managed library's request to access a native system resource by, for example, allowing a managed library 514 to execute when the managed application 412 calls the managed library 514. For example, in this embodiment the ecosystem provider may create a clear trust boundary between the managed application 412 and the operating system 404 by providing an arbitration layer that can include code that was developed by the ecosystem provider. In this example the arbitration layer can be used by un-trusted third party code to access native operating system resources in a well defined and trusted way. In one example embodiment the managed library 514 can be loaded as needed at runtime by, for example, the title player 410. During the load process the manager 516 can be configured to request a level of trust for the newly loaded library by calling native code such as code of the operating system 404 or the title player 410. The native code in this example embodiment can be configured to determine whether the assembly is trusted or not. In one embodiment the native code can be configured to check the authenticity of a certificate 312 stored in the managed library 514. If the certificate is valid, e.g., it can be decrypted by a public key stored in the secured store and its hash matches an expected value, the operating system 404 or the title player 410 can be configured to grant the managed library 514 full rights to access unallocated memory, access operating system functions, or invoke native dynamically linked libraries.

For example and continuing with the description of FIG. 8, operation 808 illustrates sending, by the managed library, a request to access the native system resource to a runtime host, wherein the runtime host is effectuated by native instructions. For example, in an embodiment of the present disclosure an operating system function can be requested by a managed application 412 and a managed library 514 can be used to implement the request by calling a runtime host 518. The runtime host 518 in this example embodiment can be effectuated by native code and can be used so that only native code accesses the operating system 404. In this example runtime host 518 can be a native dynamically linked library that includes application program interfaces for the functions that are made available to managed application 412. In this embodiment the runtime host 518 can receive an instruction from, for example, a just in time complier that received an instruction from the managed library 514 and compiled it into native code that can be processed by the runtime host 518.

Continuing with the description of FIG. 8, operation 810 illustrates accessing, by the runtime host, the native system resource. For example, the runtime host 518 can be configured in this example to receive the instruction from the managed library 514 and invoke an operating system function operable to effect the request. For example, in an embodiment of the present disclosure mobile device 200 can be a cellular phone and managed application 412 may include a music player. In this example embodiment the music playing functionality could be integrated into the operating system 404 and in order to play a song an operating system method would need to be invoked. In this example the music player could access a managed library 514 that includes an application program interface for the music player. In this example the managed library 514 could be developed by the ecosystem provider whereas the managed application 412 could have been developed by a different entity, e.g., a different company or an individual. Thus, in this example when the managed library 514 is loaded its certificate can be validated and it can be authorized to access native resources. The managed library 514 for the music player can submit a request to the runtime host 518 and the runtime host 518 can be configured to invoke the music player driver of the operating system 404 and the song can be played.

Figure 9:
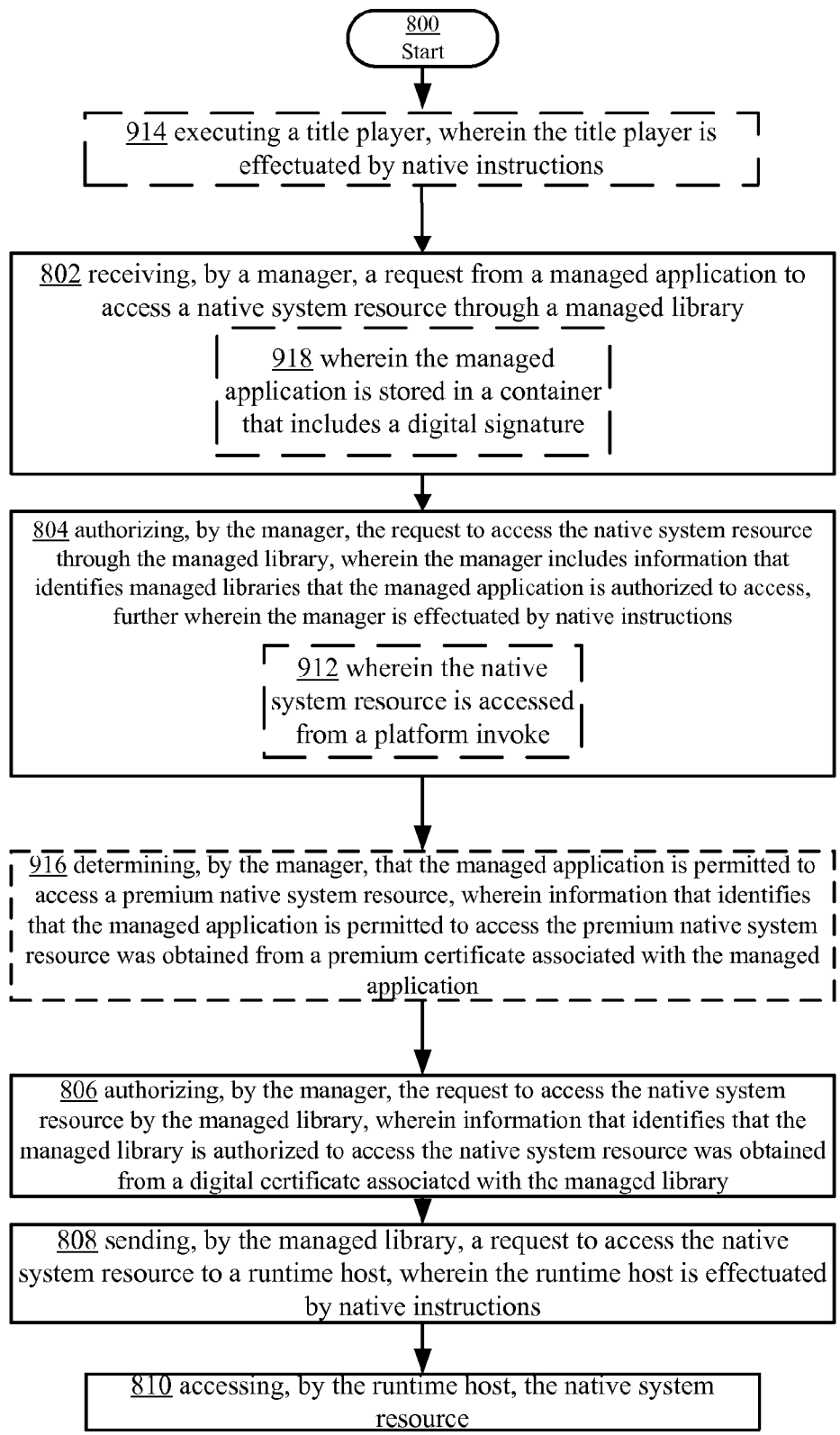
FIG. 9 depicts an alternative embodiment of the operational procedure of FIG. 8.

Referring now to FIG. 9, it illustrates an alternative embodiment of the operational procedure 800 of FIG. 8 including the additional optional operations 912, 914, 916, and 918. Referring to operation 912, it illustrates the operational procedure 800 of FIG. 8, wherein the native system resource is accessed from a platform invoke. For example, in an embodiment of the present disclosure a platform invoke can be used by managed assemblies to access a native system resource of the operating system 404, e.g., a native dynamically linked library. For example, in this embodiment when the platform invoke is used to call a function of the operating system 404 the interface for the function can be located and loaded into memory. The address of the function can be obtained and an argument for the function can be pushed to the interface. In a specific example a third party application could be a videogame that requires functionality of a graphics driver of the operating system in order to draw sprites. In this example the videogame can pass a request to draw the sprite to a managed graphics library that could for example, contain low-level application programming interface methods for drawing sprites. In this example the managed graphics library can receive the request and perform a platform invoke on, for example, runtime host 518. The interface of the runtime host 518 can be loaded into memory and the argument, e.g., the request to draw the sprite, can be pushed into a memory area reserved for the runtime host 518.

Referring again to FIG. 9, it additionally depicts operation 914 that illustrates executing a title player, wherein the title player is effectuated by native instructions. For example, in an embodiment of the present disclosure the mobile device 200 can include instructions for a title player 410. For example, in one embodiment the instructions that effectuate the title player 410 can be native to the mobile device 200, e.g., they can be instructions configured to execute on a processor of the hardware 402 of FIG. 4. In an embodiment of the present disclosure the title player can 410 can be stored in firmware of the mobile device 200 and can include a digital signature. In this example embodiment the title player 410 can be used to execute a managed application 412 and can be invoked by the shell 408. For example, a user can interact with the shell 408 and select an option to launch a program operable to pull stock information from the internet. In response to the request the shell 408, e.g., native instructions, can launch the title player 410. In at least one embodiment the shell 408 and/or the operating system 404 can be configured to check the digital signature of the title player 410 prior to execution to determine whether the title player 410 is authentic.

Continuing with the description of FIG. 9 it additionally depicts operation 916 that depicts determining, by the manager, that the managed application is permitted to access a premium native system resource, wherein information that identifies that the managed application is permitted to access the premium native system resource was obtained from a premium certificate associated with the managed application. For example, in an embodiment of the present disclosure a managed application 412 can be configured to have a premium level of access to the native functionality of the mobile device 200 via a premium managed library. For example, in an embodiment the managed application 412 may receive access to additional resources of the mobile device 200, e.g., the developer of the managed application 412 may be considered a trusted developer or other business reasons may contribute to the third party developer being granted to a higher level of resources. In this example the managed application 412 may be developed using the development studio that relies on a plurality of class libraries to implement the low level application program interfaces and these libraries may, for example, be provided by the ecosystem provider. In this example the ecosystem provider may develop a class library that has access to premium functionality of the operating system 404 such as a library that makes a DRM protected music file available to a third party application. In this embodiment the managed application 412 can be associated with a premium certificate that permits it to have access to a DRM protected audio stream. When the managed application is loaded the manager 516 can be provided with information that can be used to authorize a request to access the premium managed library.

Continuing with the description of FIG. 9, it additionally depicts operation 918 that illustrates the procedure 800, wherein the managed application is stored in a container that includes a digital signature. For example, in an embodiment of the present disclosure the managed application can be stored in a container such as the container 300 of FIG. 3. For example, in an embodiment of the present disclosure the ecosystem provider can include techniques for storing managed applications in containers and digitally signing them. In this example the ecosystem provider can be configured to generate a hash of the information in the container and encrypt the hash using a private encryption key. A corresponding public key can be stored in the secured store 418 of the mobile device 200. When the mobile device 200 opens the container 300, the public key can be used to decrypt the hash. A hash of the container 300 can be calculated and compared to the expected hash. If the hashes match then the mobile device 200 can be configured to allow the managed application from the container 300 to execute.

Figure 10:
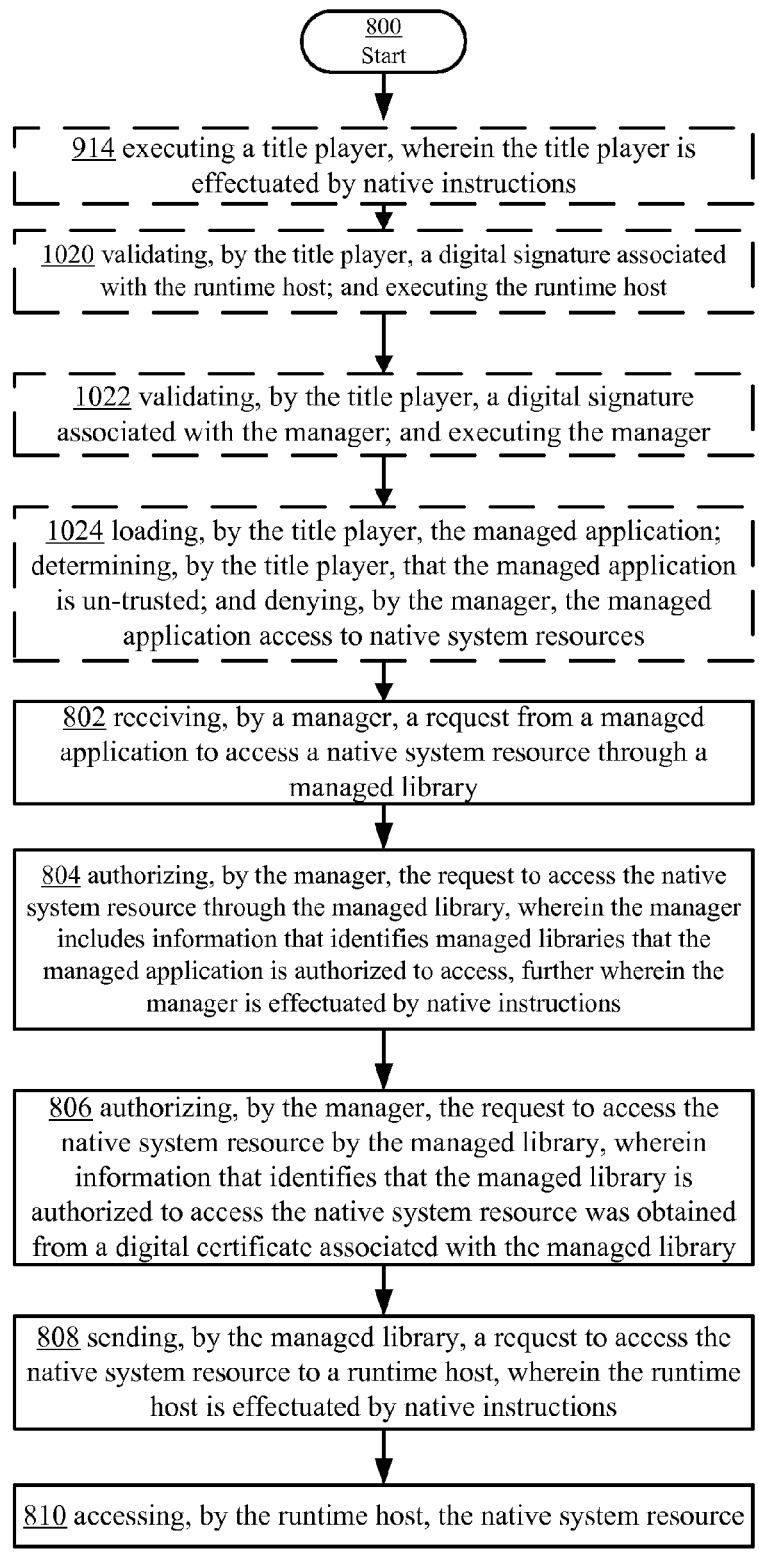
FIG. 10 depicts an alternative embodiment of the operational procedure of FIG. 9.

Referring now to FIG. 10, it depicts an alternative embodiment of the operational procedure 800 of FIG. 9 including the additional operations 1020, 1022, and 1024. Referring now to operation 1020, it illustrates validating, by the title player, a digital signature associated with the runtime host; and executing the runtime host. For example, in an embodiment of the present disclosure the title player 410 can include instructions configured to validate a digital signature of the runtime host 518 and launch the runtime host 518. For example, in an embodiment of the present disclosure the instructions that effectuate the runtime host 518 can be stored in mass storage along with a hash of the runtime host 518 encrypted with a private key. A corresponding public key can be stored in the secured store 418 of the mobile device 200 and made available when title player 410 attempts to load the runtime host 518. If the runtime host 518 is authentic then it can be loaded by the title player 410.

In an example embodiment when the mobile device 200 is powered on the runtime host 518 may be loaded into memory after a user uses the shell 408 to execute the managed application 412. For example, in an embodiment of the present disclosure the mobile device 200 may launch native instructions from the trusted layer of software when the mobile device 200 is powered on and only load the arbitration layer of FIG. 4 and FIG. 5 if a user of the mobile device 200 wants to execute a managed application 412. In this example when the title player 410 is launched it can in turn launch the runtime host 518 after it authenticates the runtime host's digital signature.

Continuing with the description of FIG. 10, operation 1022 illustrates validating, by the title player, a digital signature associated with the manager; and executing the manager. For example, in an embodiment of the present disclosure the title player 410 can include instructions configured to validate a digital signature of the manager 516 and launch the manager 516. For example, the instructions that effectuate the manager 516 can be stored in mass storage, e.g., flash or a hard disk, along with a hash of the instructions encrypted with a private key. A corresponding public key can be stored in the secured store 418 of the mobile device 200 and made available when title player 410 attempts to load the manager 516. If the manager 516 is authentic then it can be loaded by the title player 410.

In an example embodiment when the mobile device 200 is powered on the manager 516 may be loaded into memory after a user uses the shell 408 to execute the managed application 412. For example, in an embodiment of the present disclosure the mobile device 200 may launch native instructions from the trusted layer of software when the mobile device 200 is powered on and only load the arbitration layer of FIG. 4 and FIG. 5 if a user of the mobile device 200 wants to execute a managed application 412. In this example when the title player 410 is launched it can in turn launch the manager 516 after it authenticates the manager's digital signature.

Continuing with the description of FIG. 10 it additionally depicts operation 1024 that shows loading, by the title player, the managed application; determining, by the title player, that the managed application is un-trusted; and denying, by the manager, the managed application access to native system resources. For example, in an embodiment of the present disclosure title player 410 can be configured to load the managed application 412 in response to user input and determine that the managed application 412 is un-trusted. For example, the managed application 412 can be considered un-trusted if it lacks a digital certificate 312. In this embodiment the ecosystem provider may not associate a digital certificate with the managed application 412 if it was developed by a third party such as a remote company or individual. In another embodiment the ecosystem provider may associate a certificate with the managed application 412 that identifies it as un-trusted. In either example embodiment the ecosystem provider may determine that code developed by a third party can be configured to access managed libraries that the ecosystem provider developed and the manager 516 can be configured to prevent the managed application 412 from accessing native resources such as native dynamically linked libraries. In this example, the title player 410 can open the managed application and determine that it is to be considered un-trusted. The title player 410 in this example can make this information available to the manager 516 that can in turn monitor instructions that the third party application issues. In the event that the application attempts to access native instructions of the system, e.g., an operating system method, a security violation can be detected and the manager 516 can terminate the managed application 412.

Figure 11:
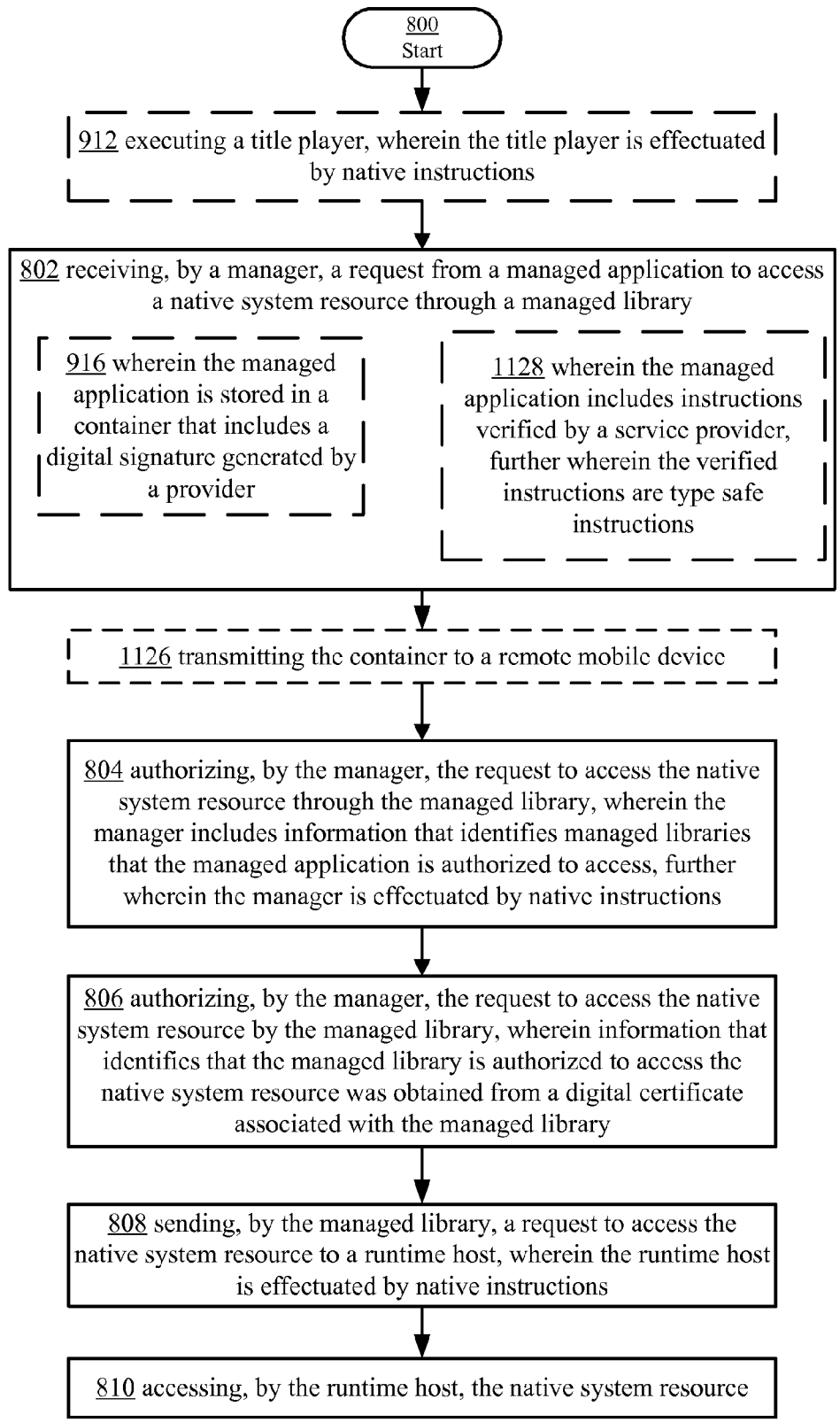
FIG. 11 depicts an alternative embodiment of the operational procedure of FIG. 9.

Referring now to FIG. 11, it depicts an alternative embodiment of the operational procedure 800 of FIG. 9 including the additional operations 1126, and 1128. Referring now to operation 1126, it illustrates transmitting the container to a remote mobile device. For example, and referring to FIG. 2, in an embodiment of the present disclosure a mobile device 200 can include a wireless and/or wired network connection to a remote mobile device 202. In this example the mobile device 200 can share the managed application 412 with the remote mobile device 202. For example, the remote mobile device 202 could use the shared application for a limited amount of time or a limited amount of executes before the managed application 412 locks. In this example the remote mobile device 202 could access the electronic market place 222 and purchase a full license to the managed application 412.

Continuing with the description of FIG. 11, it additionally illustrates operation 1128 that illustrates an alternative embodiment of the operational procedure of FIG. 9, wherein the managed application includes instructions verified by a service provider, further wherein the verified instructions are type safe instructions. For example, in an embodiment of the present disclosure the managed application 412 can be previously verified by the ecosystem provider prior to distributing the managed application 412 to the mobile device 200. For example, in an embodiment verification can include examining the instructions and metadata associated with the managed application 412 to determine whether the code is type safe, e.g., that it accesses members of an object in well defined and allowed ways, it only accesses memory locations it is authorized to access, and/or that it does not access any private members of an object. During the verification process, the managed application's instructions can be examined in an attempt to confirm that the instructions can only access approved memory locations and/or call methods only through properly defined types.

Figure 12:
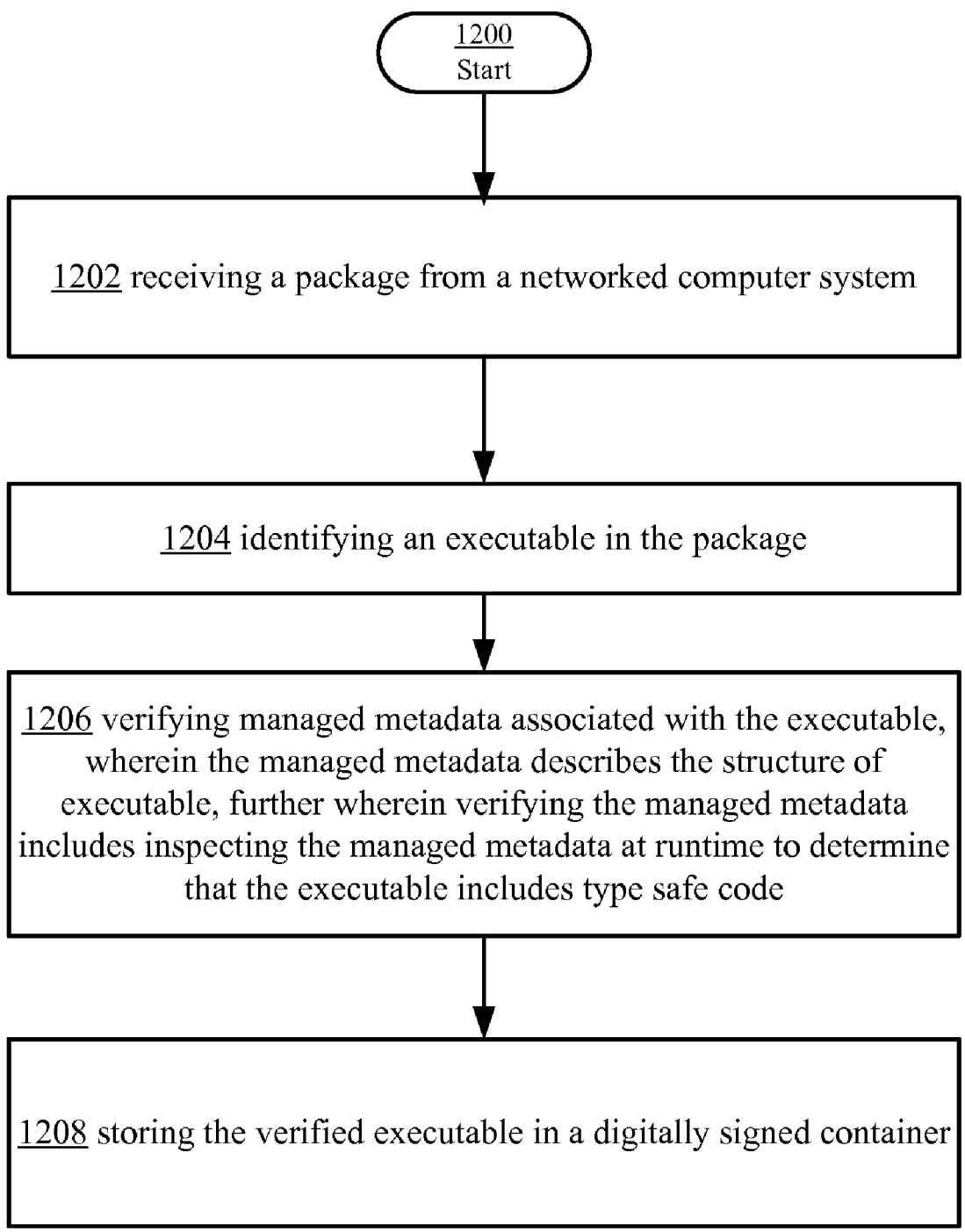
FIG. 12 depicts an example operational procedure related to publishing videogames configured to execute on a mobile device.

Referring now to FIG. 12, it illustrates an example operational procedure related to publishing videogames configured to execute on a mobile device including operations 1200, 1202, 1204, 1206, and 1208. Operation 1200 begins the operational procedure and operation 1202 illustrates receiving a package from a networked computer system. For example, and referring to FIG. 2, a network adaptor of a validation system 212 can receive a package from a networked computer system that can include, but is not limited to, a community feedback server 206, a peer reviewer, and/or a developer 204. In an example embodiment of the present disclosure the package can include one or more assemblies, e.g., executables and dynamically linked libraries. In one example the libraries could be made by the developer 204 and/or by the ecosystem provider.

Continuing with the description of FIG. 12, operation 1204 illustrates identifying an executable in the package. For example, in an embodiment of the present disclosure the package can be received by the validation system 212 and sent to a file parser 216. For example, the file parser 216 can be configured to scan the package for assemblies that contain executables. For example, in one embodiment the parser 216 can be configured to check the entire package for .exe files, and/or files that include executables stored in, for example, images and generate a list of all .exe and .dll files in the package.

Continuing with the description of FIG. 12, operation 1206 illustrates verifying managed metadata associated with the executable, wherein the managed metadata describes the structure of executable, further wherein verifying the managed metadata includes inspecting the managed metadata at runtime to determine that the executable includes type safe code. For example, in an embodiment of the present disclosure after the file parser 216 identifies executables in the package a list of executables and the package can be transmitted to the file verification system 218. The verification system 218 in this example embodiment can be configured to determine whether the executables are valid by checking, for example, certain values in the header and the metadata. For example, in an embodiment of the present disclosure the verification system 218 can be configured to validate the metadata by exercising it. As was described above, in one embodiment a package can be submitted that can include one or more assemblies each of which can include intermediate language instructions and metadata. In this example the verification system 218 can be configured to inspect each assembly's metadata using a process called reflection, and inspect each assembly's managed instructions. The reflection process includes an application programming interface that can walk through the managed metadata and monitor the runtime characteristics of the metadata to identify malicious instructions that could, for example, attempt to access native code or access the secured content on the mobile device 200. In addition, the reflection API can be configured to determine whether the instructions are type safe, e.g., that it accesses members of an object in well defined and allowed ways, it only accesses memory locations it is authorized to access, and/or that it does not access any private members of an object.

In another example embodiment the verification system 218 can be configured to identify managed libraries that the executables attempt to link at runtime and compare them to a list of approved managed libraries. The verification system 218 can be configured in this example to reject any executable that attempts to link a restricted library or a library that the application should not have access to, e.g., a videogame should not have access to a managed library that can access device keys stored in a secured store 418.

Continuing with the description of FIG. 12, operation 1208 illustrates storing the verified executable in a digitally signed container. For example, once the executable is verified by the verification system 218 it can be sent to a signing system 220 configured to repackage the assemblies into a container such as container 300 of FIG. 3 and digitally sign the container 300. The signing system 220 in this example can be configured to generate a hash of the instructions in the container 300 and encrypt the hash with a private key. In this example a mobile device 200 can be configured to include a public key usable to decrypt the container 300 and compare the hash of the information in the container 300 to the expected result. Once the container 300 is signed it can in one embodiment transmit the container 300 to an electronic market place 222 where it can be purchased by a user of the mobile device 200 and downloaded. In another embodiment the signing system 220 can be configured to include information that identifies what managed libraries can be accessed by the container 300 in digital certificates for each assembly stored in the container 300.

Figure 13:
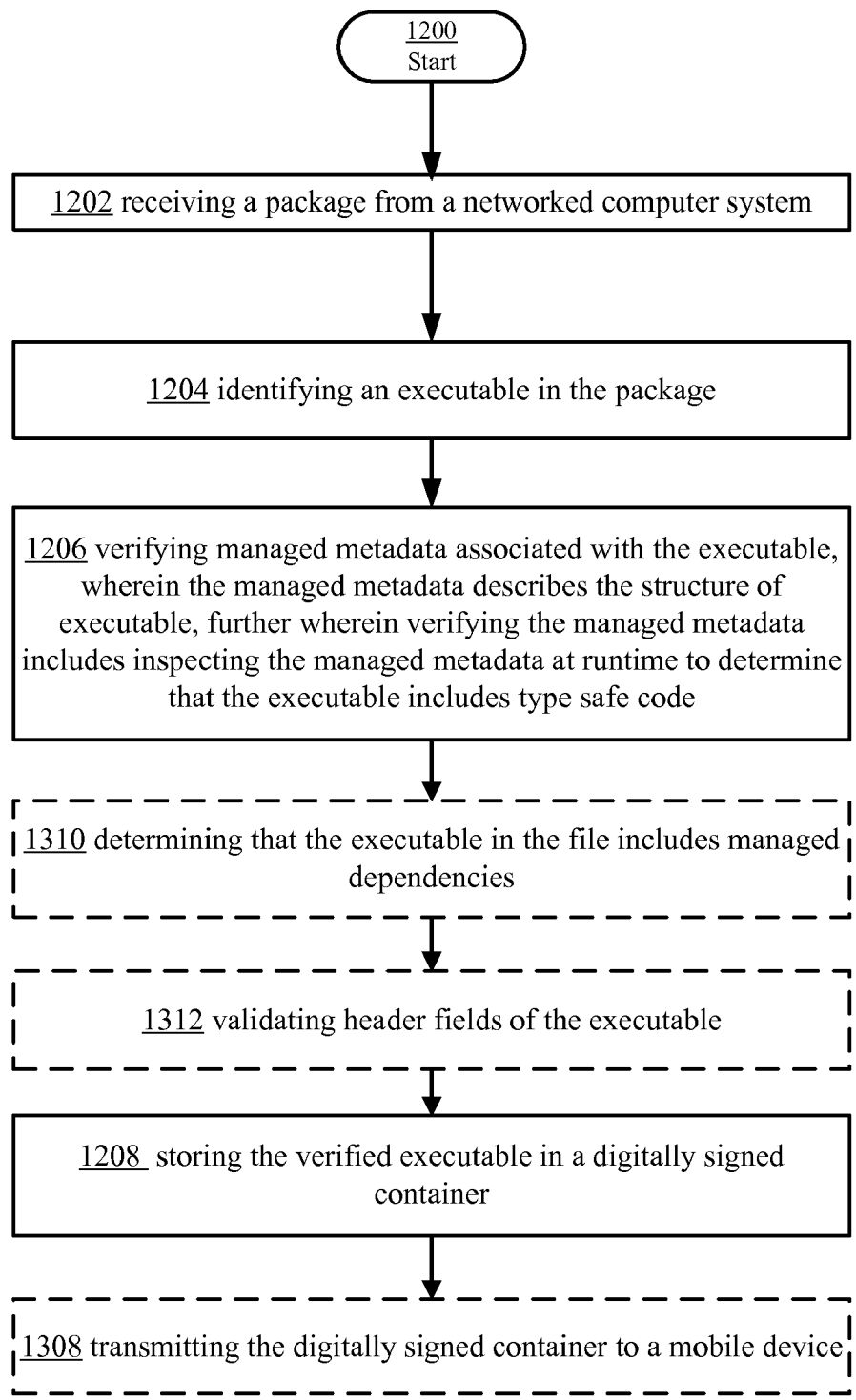
FIG. 13 depicts an alternative embodiment of the operational procedure of FIG. 12.

Referring now to FIG. 13, it illustrates an alternative embodiment of the operational procedures of FIG. 12 including the additional operations 1310, 1312, and 1314. Referring now to operation 1310, it illustrates transmitting the digitally signed container to a mobile device. For example, in an embodiment of the present disclosure the container 300 can be transmitted to a mobile device 200 after, for example, it is purchased. As stated above, in an embodiment of the present disclosure the ecosystem provider can maintain an electronic market place 222 that is configured to allow users to purchase games that are submitted by third party developers such as companies and/or individuals that obtain the software developers kit.

Continuing with the description of FIG. 13, it additionally illustrates operation 1310 that depicts determining that the executable in the file includes managed dependencies. For example, in at least one example embodiment the verification system 218 can be additionally configured to determine what dependencies are required by the executable and either reject the package or forward the package to the signing system 220. For example, the verification system 218 in this embodiment can be configured to identify the set of assemblies in the applications' runtime profile. The verification system 218 in this example can identify each assembly and determine whether the assemblies are developed by the ecosystem provider or the developer 204. In the instance where an identified assembly is developed by the ecosystem provider the verification system 218 can be configured to determine whether the assembly is on a white list for the type of managed application, e.g., the verification system 218 can check the white list to determine whether an assembly that can access the secured store 418 is allowed to be called by a videogame. If the assembly is not on the white list, the process can end and a message can be sent to the developer 204 stating that the assembly is not accessible to, for example, the type of managed application and/or the developer 204, e.g., the developer 204 may not have trusted status. The verification system 218 in this example can additionally check to determine that native libraries are not referenced by the metadata. In a specific example, if the managed application includes a reference to a native library then the managed application can access the library and take control of the mobile device 200. If the verification system 218 determines that the assembly references a native library the verification process can end and a message can be sent to the submitter stating that the validation process failed because a native library was referenced.

Continuing with the description of FIG. 13, it additionally illustrates operation 1312 that depicts validating header fields of the executable. For example, in an embodiment of the present disclosure the header fields of the executable can be checked by the verification system 218 to determine whether they include expected header values. For example, each executable can include one or more headers that can include information such as how the runtime environment is to map the file into memory or how configure the loader and linker. The file in this example can additionally include data directory header values that contain pointers to data. For example, in an embodiment the verification system 218 can be configured to check the header values and fail any package that includes values that are associated with files that include native instructions.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A computer readable storage medium excluding signals including computer executable instructions for securing a computing device, the computer readable storage medium comprising:
   instructions for validating, by a title player effectuated by native instructions, a digital signature of a manager and a digital signature of a managed library;
   instructions for granting, to the managed library, access to native functions of an operating system in response to validating a first digital certificate associated with the managed library; and
   instructions for denying, by the manager, an attempt by a managed application to access a native function of the operating system in response to determining that a second digital certificate associated with the managed application indicates that the managed application is required to access native functions of the operating system through the managed library.

2. The computer readable storage medium of claim 1, wherein the managed library comprises instructions generated by a trusted developer.

3. The computer readable storage medium of claim 1, further comprising:
   instructions for verifying a digital signature associated with a container that includes the managed application; and
   instructions for loading the managed application.

4. The computer readable storage medium of claim 1, wherein the native functions of the operating system are accessed through instructions for a runtime host, further wherein the instructions for the runtime host are effectuated by native instructions.

5. The computer readable storage medium of claim 1, further comprising:
   instructions for verifying a digital signature associated with the managed library; and
   instructions for loading the managed library.

6. The computer readable storage medium of claim 1, wherein the managed application includes instructions verified by a remote device, further wherein the verified instructions are type safe.

7. A method for protecting a closed computing device from executing un-trusted instructions, the method comprising:
   validating, by a title player effectuated by native instructions, a digital signature of a manager and a digital signature of a managed library;
   receiving, by the manager, a request from a managed application to access a native system resource through the managed library;
   authorizing, by the manager, the request to access the native system resource through the managed library, wherein the manager includes information that identifies managed libraries that the managed application is authorized to access, further wherein the manager is effectuated by native instructions;
   authorizing, by the manager, the request to access the native system resource by the managed library, wherein information that identifies that the managed library is authorized to access the native system resource was obtained from a digital certificate associated with the managed library;
   sending, by the managed library, a request to access the native system resource to a runtime host, wherein the runtime host is effectuated by native instructions; and
   accessing, by the runtime host, the native system resource.

8. The method of claim 7, wherein the native system resource is accessed from a platform invoke.

9. The method of claim 7, further comprising:
   determining, by the manager, that the managed application is permitted to access a premium native system resource, wherein information that identifies that the managed application is permitted to access the premium native system resource was obtained from a premium certificate associated with the managed application.

10. The method of claim 7, wherein the managed application is stored in a container that includes a digital signature.

11. The method of claim 7, further comprising:
    validating, by the title player, a digital signature associated with the runtime host; and
    executing the runtime host.

12. The method of claim 7, further comprising:
    validating, by the title player, a digital signature associated with the manager; and
    executing the manager.

13. The method of claim 7, further comprising:
loading, by the title player, the managed application;
determining, by the title player, that the managed application is un-trusted; and
denying, by the manager, the managed application access to native system resources.

14. The method of claim 9, further comprising:
transmitting the container to a remote mobile device.

15. The method of claim 9, wherein the managed application includes instructions verified by a service provider, further wherein the verified instructions are type safe instructions.

16. A computer system for publishing videogames configured to execute on a mobile device, the system comprising:
a processor; and
a memory coupled to the processor, the memory including instructions that upon execution cause the computer system to:
validate, by a native executable that is configured to launch executables and host them within the native executable, a digital signature of a manager and a digital signature of a managed library;
receive a package from a networked computer system;
identify a package executable in the package;
verify managed metadata associated with the package executable, wherein the managed metadata describes the structure of package executable, further wherein verifying the managed metadata includes inspecting the managed metadata at runtime to determine that the executable includes type safe code;
store the verified executable in a digitally signed container;
authorize, by the manager, a request by the package executable to access a native system resource through the managed library, wherein the manager includes information that identifies managed libraries that the managed application is authorized to access, further wherein the manager is effectuated by native instructions.

17. The system of claim 16, wherein the memory further includes instructions that upon execution cause the computer system to:
transmit the digitally signed container to a mobile device.

18. The system of claim 16, wherein the memory further includes instructions that upon execution cause the computer system to:
determine that the executable in the file includes managed dependencies.

19. The system of claim 16, wherein the memory further includes instructions that upon execution cause the computer system to:
validate header fields of the executable.

* * * * *